US010805821B2

(12) United States Patent
Gheorghiu et al.

(10) Patent No.: US 10,805,821 B2
(45) Date of Patent: Oct. 13, 2020

(54) SIGNALING AVAILABILITY DURING A MEASUREMENT WINDOW

(71) Applicant: QUALCOMM Incorporated, San Diego, CA (US)

(72) Inventors: Valentin Alexandru Gheorghiu, Tokyo (JP); Andrea Garavaglia, Nuremberg (DE); Awlok Singh Josan, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/273,790

(22) Filed: Feb. 12, 2019

(65) Prior Publication Data
US 2019/0261206 A1 Aug. 22, 2019

Related U.S. Application Data

(60) Provisional application No. 62/632,358, filed on Feb. 19, 2018.

(51) Int. Cl.
H04W 24/10 (2009.01)
H04B 7/08 (2006.01)
(Continued)

(52) U.S. Cl.
CPC ............ *H04W 24/10* (2013.01); *H04B 7/086* (2013.01); *H04L 1/1614* (2013.01);
(Continued)

(58) Field of Classification Search
CPC ..... H04B 7/0617; H04B 7/086; H04L 1/1614; H04L 5/0048; H04L 27/26;
(Continued)

(56) References Cited

U.S. PATENT DOCUMENTS

2018/0324022 A1* 11/2018 Sheng ................. H04L 27/2692
2019/0246387 A1* 8/2019 Lee ........................... H04L 5/00
2019/0349960 A1* 11/2019 Li ......................... H04L 1/1812

OTHER PUBLICATIONS

Ericsson: "Intrafrequency Measurements with Mixed Numerology or RX", 3GPP Draft; R4-1800186 Intra RXBF Mixed Numerology, 3rd Generation Partnership Project (3GPP), Mobile Competence Centre; 650, Route Des Lucioles; F-06921 Sophia-Antipolis Cedex; France, vol. RAN WG4, No. San Diego, USA; Jan. 22, 2018-Jan. 26, 2018 Jan. 15, 2018, XP051387901, Retrieved from the Internet: URL:http://www.3gpp.org/ftp/tsg%5Fran/WG4%5FRadio/TSGR4%5FAHs/TSGR4%5FAH%2D1801/Docs/ [retrieved on Jan. 15, 2018], 4 pages.
International Search Report and Written Opinion—PCT/US2019/017845—ISA/EPO—dated Apr. 10, 2019.
NTT Docomo et al., "Remaining Issues on Measurement for Mobility Management", 3GPP Draft; 3GPP TSG RAN WG1 Meeting AH 1801, R1-1800655_Remaining Issues on Measurement for Mobility Management_Final, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018, XP051384977, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 8 pages, Section 2.

(Continued)

Primary Examiner — David B Lugo
(74) Attorney, Agent, or Firm — Norton Rose Fulbright LLP

(57) ABSTRACT

Systems, methods, apparatuses, and computer-readable storage media for communicating a base station signal, such as a data signal, a control signal, or both, from a base station to a user equipment (UE) during a measurement window. In some aspects, the UE signals its availability corresponding to a measurement window to a serving base station. In some aspects, the UE signals a guard period associated with the measurement window to the serving base station. In other aspects, the serving base station signals a guard period to the UE.

30 Claims, 7 Drawing Sheets

(51) Int. Cl.

| | | |
|---|---|---|
| | *H04L 1/16* | (2006.01) |
| | *H04L 27/26* | (2006.01) |
| | *H04W 56/00* | (2009.01) |
| | *H04W 52/02* | (2009.01) |
| | *H04B 7/06* | (2006.01) |
| | *H04L 5/00* | (2006.01) |

(52) U.S. Cl.
CPC ...... *H04L 27/2646* (2013.01); *H04L 27/2666* (2013.01); *H04W 52/0229* (2013.01); *H04W 56/0015* (2013.01); *H04W 56/0055* (2013.01); *H04B 7/0617* (2013.01); *H04L 5/0048* (2013.01); *H04L 27/26* (2013.01)

(58) Field of Classification Search
CPC ........... H04L 27/2666; H04L 27/2646; H04W 24/10; H04W 52/0229; H04W 56/0015; H04W 56/0055
See application file for complete search history.

(56) References Cited

OTHER PUBLICATIONS

Samsung: "Summary of Remaining Issues on NR RRM", 3GPP Draft; R1-1721724 Summary of the Issues for NR RRM Before Friday Online, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Dec. 4, 2017, XP051370799, Retrieved from the Internet: URL:http://www.3gpp.org/ftp/tsg%5Fran/WG1%5FRL1/TSGR1%5F91/Docs/ [retrieved on Dec. 4, 2017], Section 8, 37 pages.

\* cited by examiner

SIGNALING AVAILABILITY DURING A MEASUREMENT WINDOW

CROSS-REFERENCE TO RELATED APPLICATIONS

This application claims the benefit of U.S. Provisional Patent Application No. 62/632,358, entitled, "SIGNALING AVAILABILITY DURING A MEASUREMENT WINDOW," filed on Feb. 19, 2018, which is expressly incorporated by reference herein in its entirety.

TECHNICAL FIELD

Aspects of the present disclosure relate generally to wireless communication systems, and more particularly, to methods, systems, apparatuses, and networks providing improved wireless communications and resource utilization during a measurement window, such as a measurement window during which one or more synchronization signal blocks (SSBs) are communicated.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

In some wireless networks, a UE may receive control and data signals from a serving base station and, in addition, may receive synchronization signals from one or more neighboring base stations. For example, the UE may use beamforming to perform mobility measurements in a certain direction, and at a given point in time, to receive synchronization signals. The mobility measurements may be used by the UE for signal/channel quality measurements, link monitoring, beam management, etc., as illustrative, non-limiting examples. While the UE is using beamforming during a measurement window to receive the synchronization signals, the UE is unable to receive signals (e.g., data and/or control signals) from the serving base station. To illustrate, in millimeter-Wave (mmWave) when the UE is beamforming during a measurement window, the same analog beam is used for an entire frequency range and all component carries in inter-band CA are unavailable for transmission of data/control information. When the UE is performing the mobility measurements, there may be one or more portions of the measurement window when the UE is not receiving synchronization signals. Additionally, even if the UE does not perform mobility measurements during a measurement window, the serving base station assumes that the UE is performing mobility measurements and abstains from sending signals (e.g., data and/or control information) to the UE during the measurement window. Accordingly, the overhead associated with performance of the mobility measurements result in inefficiencies in a wireless network, such as low data rates, reduced capacity and low spectral efficiency.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is provided. For example, a method can include determining, by a user equipment (UE), whether to monitor at least a portion of a synchronization signal block (SSB) during a measurement window. The method may further include transmitting, by the UE prior to the measurement window, a signal that indicates whether the UE will monitor the at least the portion of the SSB during the measurement window.

In an additional aspect of the disclosure, an apparatus configured for wireless communication is provided. For example, the apparatus can include one or more processors configured to determine whether to monitor, at a user equipment (UE), at least a portion of a synchronization signal block (SSB) during a measurement window. The apparatus may further include a transmitter coupled to the one or more processors, the transmitter configured to transmit, prior to the measurement window, a signal that indicates whether the UE will monitor the at least the portion of the SSB during the measurement window.

In an additional aspect of the disclosure, a non-transitory computer-readable medium storing instructions that, when executed by one or more processors, cause the one or more processors to perform operations for wireless communication. The operations can include code to determining, by a user equipment (UE), whether to monitor at least a portion of a synchronization signal block (SSB) during a measurement window. The operations may further include transmitting, by the UE prior to the measurement window, a signal that indicates whether the UE will monitor the at least the portion of the SSB during the measurement window.

In an additional aspect of the disclosure, an apparatus configured for wireless communication is provided. For example, the apparatus can include means for determining whether to monitor, at a user equipment (UE), at least a portion of a synchronization signal block (SSB) during a measurement window. The apparatus may further include means for transmitting, prior to the measurement window, a signal that indicates whether the UE will monitor the at least the portion of the SSB during the measurement window.

In an additional aspect of the disclosure, a method for wireless communication is provided. For example, a method can include receiving, by a base station from a user equipment (UE), a signal that indicates whether the UE will monitor at least a portion of a synchronization signal block (SSB) during a measurement window. The method may further include transmitting, from the base station to the UE based on the signal, a data signal or a control signal during the measurement window.

In an additional aspect of the disclosure, an apparatus configured for wireless communication is provided. For example, the apparatus can include a receiver configured to receive, by a base station from a user equipment (UE), a signal that indicates whether the UE will monitor at least a portion of a synchronization signal block (SSB) during a measurement window. The apparatus may further include one or more processors coupled to the receiver, the one or more processors configured to initiate transmission, from the base station to the UE based on the signal, of a data signal or a control signal during the measurement window.

In an additional aspect of the disclosure, a non-transitory computer-readable medium storing instructions that, when executed by one or more processors, cause the one or more processors to perform operations for wireless communication. The operations can include receiving, by a base station from a user equipment (UE), a signal that indicates whether the UE will monitor at least a portion of a synchronization signal block (SSB) during a measurement window. The operations may further include transmitting, from the base station to the UE based on the signal, a data signal or a control signal during the measurement window.

In an additional aspect of the disclosure, an apparatus configured for wireless communication is provided. For example, the apparatus can include means for receiving, by a base station from a user equipment (UE), a signal that indicates whether the UE will monitor at least a portion of a synchronization signal block (SSB) during a measurement window. The apparatus may further include means for transmitting, from the base station to the UE based on the signal, a data signal or a control signal during the measurement window.

In an additional aspect of the disclosure, a method for wireless communication is provided. For example, a method can include determining, by a user equipment (UE), a guard period associated with monitoring at least a portion of a synchronization signal block (SSB) during a measurement window. The method may further include transmitting, by the UE prior to the measurement window, a signal that indicates the guard period.

In an additional aspect of the disclosure, an apparatus configured for wireless communication is provided. For example, the apparatus can include one or more processors configured to determine a guard period associated with monitoring at least a portion of a synchronization signal block (SSB) during a measurement window. The apparatus may further include a transmitter coupled to the one or more processors, the transmitter configured to transmit, prior to the measurement window, a signal that indicates that indicates the guard period.

In an additional aspect of the disclosure, a non-transitory computer-readable medium storing instructions that, when executed by one or more processors, cause the one or more processors to perform operations for wireless communication. The operations can include determining, by a user equipment (UE), a guard period associated with monitoring at least a portion of a synchronization signal block (SSB) during a measurement window. The operations may further include transmitting, by the UE prior to the measurement window, a signal that indicates the guard period.

In an additional aspect of the disclosure, an apparatus configured for wireless communication is provided. For example, the apparatus can include means for determining, by a user equipment (UE), a guard period associated with monitoring at least a portion of a synchronization signal block (SSB) during a measurement window. The apparatus may further include means for transmitting, prior to the measurement window, a signal that indicates the guard period.

In an additional aspect of the disclosure, a method for wireless communication is provided. For example, a method can include receiving, by a base station from a user equipment (UE), a signal that indicates a guard period associated with the UE monitoring at least a portion of a synchronization signal block (SSB) during a measurement window. The method may further include transmitting, from the base station to the UE based on the guard period, a data signal or a control signal during the measurement window.

In an additional aspect of the disclosure, an apparatus configured for wireless communication is provided. For example, the apparatus can include a receiver configured to receive, by a base station from a user equipment (UE), a signal that indicates a guard period associated with the UE monitoring at least a portion of a synchronization signal block (SSB) during a measurement window. The apparatus may further include one or more processors coupled to the receiver, the one or more processors configured to initiate transmission, from the base station to the UE based on the guard period, of a data signal or a control signal during the measurement window.

In an additional aspect of the disclosure, a non-transitory computer-readable medium storing instructions that, when executed by one or more processors, cause the one or more processors to perform operations for wireless communication. The operations can include receiving, by a base station from a user equipment (UE), a signal that indicates a guard period associated with the UE monitoring at least a portion of a synchronization signal block (SSB) during a measurement window. The operations may further include transmitting, from the base station to the UE based on the guard period, a data signal or a control signal during the measurement window.

In an additional aspect of the disclosure, an apparatus configured for wireless communication is provided. For example, the apparatus can include means for receiving, by a base station from a user equipment (UE), a signal that indicates a guard period associated with the UE monitoring at least a portion of a synchronization signal block (SSB) during a measurement window. The apparatus may further include means for transmitting, from the base station to the UE based on the guard period, a data signal or a control signal during the measurement window.

In an additional aspect of the disclosure, a method for wireless communication is provided. For example, a method can include determining, by a base station, a guard period associated with a user equipment (UE) monitoring at least a portion of a synchronization signal block (SSB) during a measurement window. The method may further include transmitting, from the base station to the UE prior to the measurement window, a guard period signal that indicates the guard period.

In an additional aspect of the disclosure, an apparatus configured for wireless communication is provided. For example, the apparatus can include one or more processors configured to determining, by a base station, a guard period associated with a user equipment (UE) monitoring at least a portion of a synchronization signal block (SSB) during a measurement window. The apparatus may further include a transmitter coupled to the one or more processors, the transmitter configured to transmit, from the base station to the UE prior to the measurement window, a guard period signal that indicates the guard period.

In an additional aspect of the disclosure, a non-transitory computer-readable medium storing instructions that, when executed by one or more processors, cause the one or more processors to perform operations for wireless communication. The operations can include determining, by a base station, a guard period associated with a user equipment (UE) monitoring at least a portion of a synchronization signal block (SSB) during a measurement window. The operations may further include transmitting, from the base station to the UE prior to the measurement window, a guard period signal that indicates the guard period.

In an additional aspect of the disclosure, an apparatus configured for wireless communication is provided. For example, the apparatus can include means for determining, by a base station, a guard period associated with a user equipment (UE) monitoring at least a portion of a synchronization signal block (SSB) during a measurement window. The apparatus may further include means for transmitting, from the base station to the UE prior to the measurement window, a guard period signal that indicates the guard period.

In an additional aspect of the disclosure, a method for wireless communication is provided. For example, a method can include receiving, by a user equipment (UE) from a base station, a guard period signal that indicates a guard period associated with the UE monitoring at least a portion of a synchronization signal block (SSB) during a measurement window. The method may further include determining, by the UE based on the guard period, a time period during the measurement window when the UE is available to receive a data signal or a control signal from the base station. The method may also include receiving, by the UE from the base station, the data signal or the control signal during the time period.

In an additional aspect of the disclosure, an apparatus configured for wireless communication is provided. For example, the apparatus can include a receiver configured to receive, by a user equipment (UE) from a base station, a guard period signal that indicates a guard period associated with the UE monitoring at least a portion of a synchronization signal block (SSB) during a measurement window. The apparatus may also include one or more processors coupled to the receiver and configured to determine, by the UE based on the guard period, a time period during the measurement window when the UE is available to receive a data signal or a control signal from the base station.

In an additional aspect of the disclosure, a non-transitory computer-readable medium storing instructions that, when executed by one or more processors, cause the one or more processors to perform operations for wireless communication. The operations can include receiving, by a user equipment (UE) from a base station, a guard period signal that indicates a guard period associated with the UE monitoring at least a portion of a synchronization signal block (SSB) during a measurement window. The operations may also include determining, by the UE based on the guard period, a time period during the measurement window when the UE is available to receive a data signal or a control signal from the base station. The operations may further include receiving, by the UE from the base station, the data signal or the control signal during the time period In an additional aspect of the disclosure, an apparatus configured for wireless communication is provided. For example, the apparatus can include means for receiving, by a user equipment (UE) from a base station, a guard period signal that indicates a guard period associated with the UE monitoring at least a portion of a synchronization signal block (SSB) during a measurement window. The apparatus may further include means for determining, by the UE based on the guard period, a time period during the measurement window when the UE is available to receive a data signal or a control signal from the base station.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
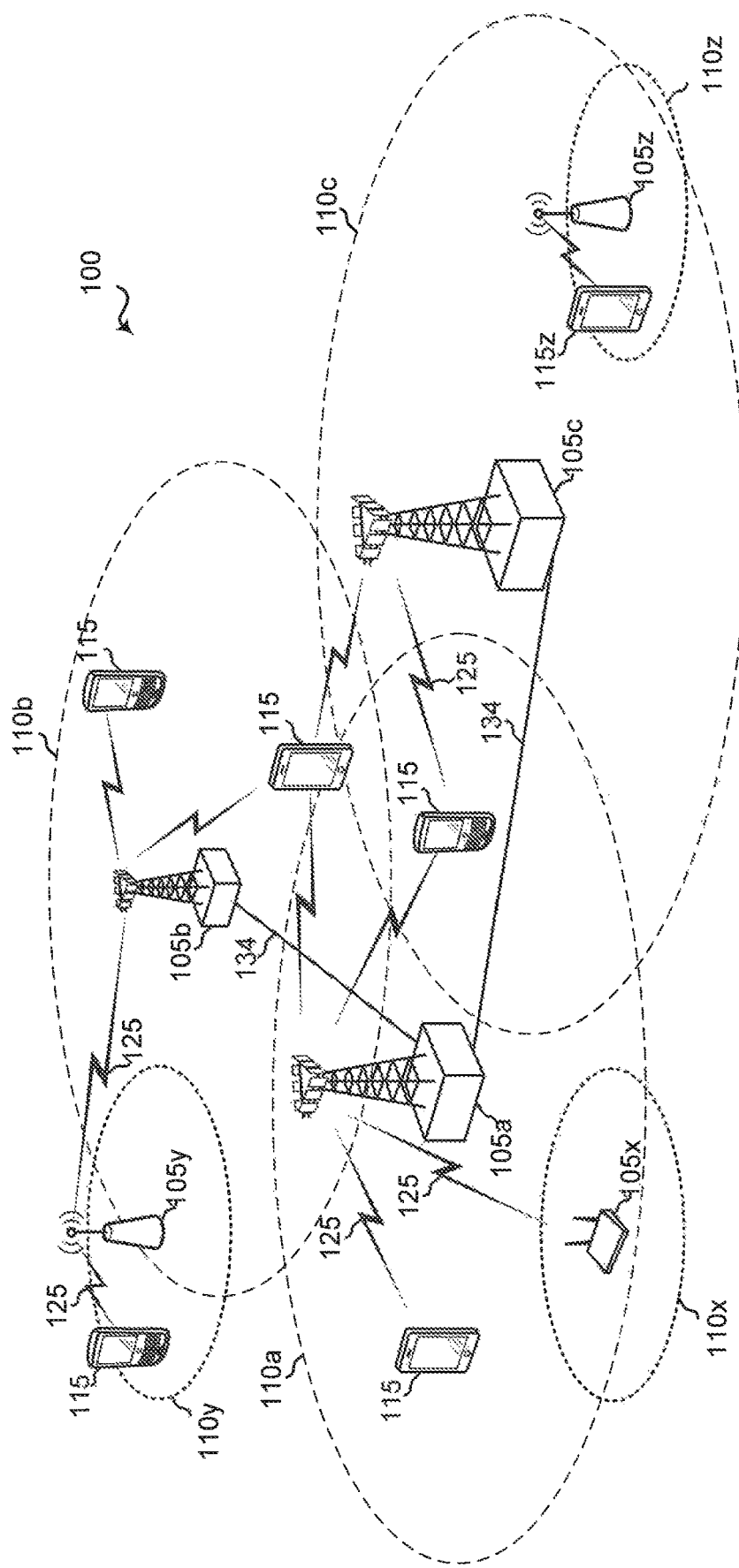
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as embodiments of one or more of UEs 115, may include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
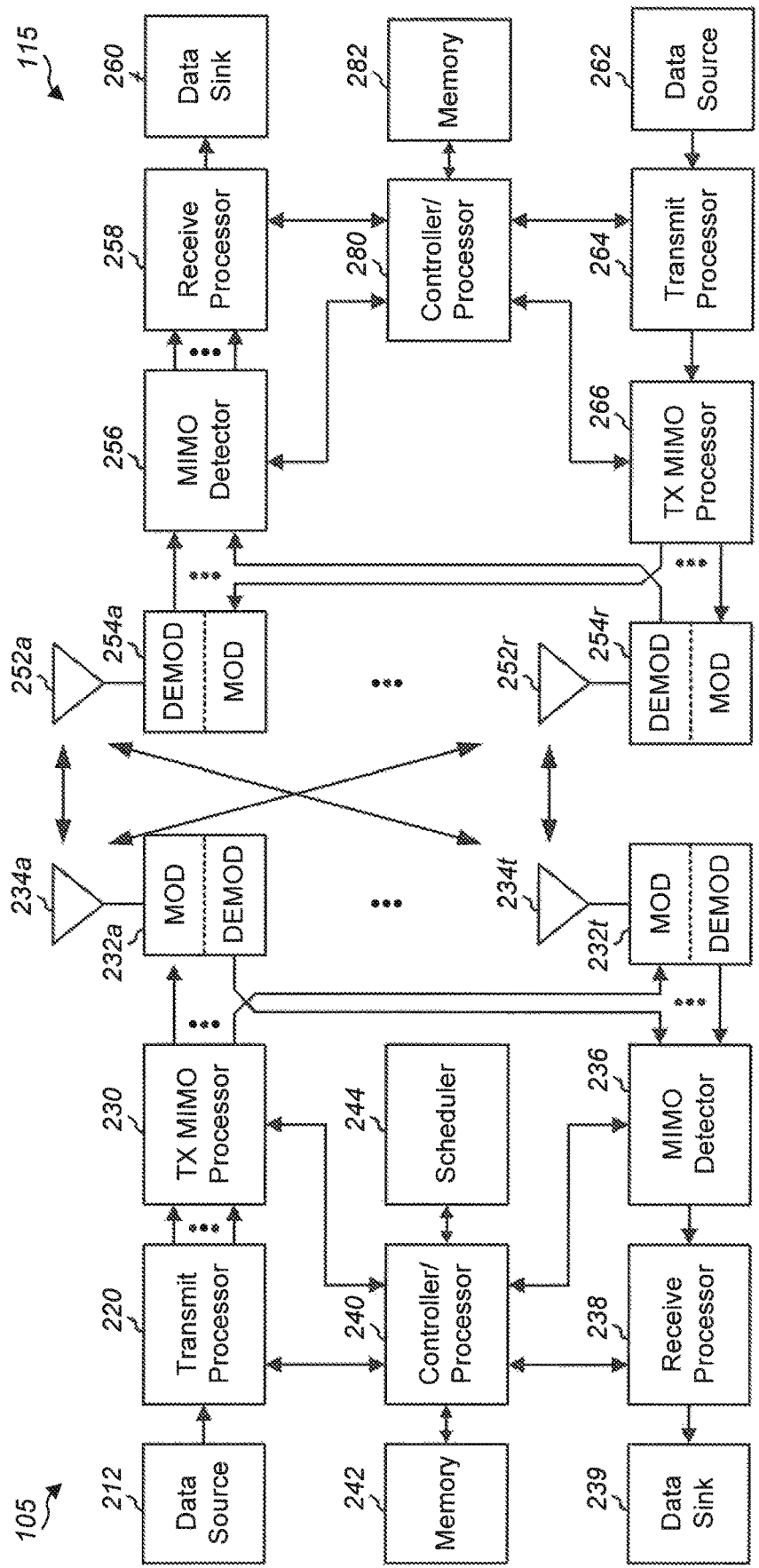
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein. Memories 242 and 282 may store data and program codes for gNB 105 and UE 115, respectively. Scheduler 244 may schedule UEs for data transmission on the downlink and/or uplink.

Figure 3:
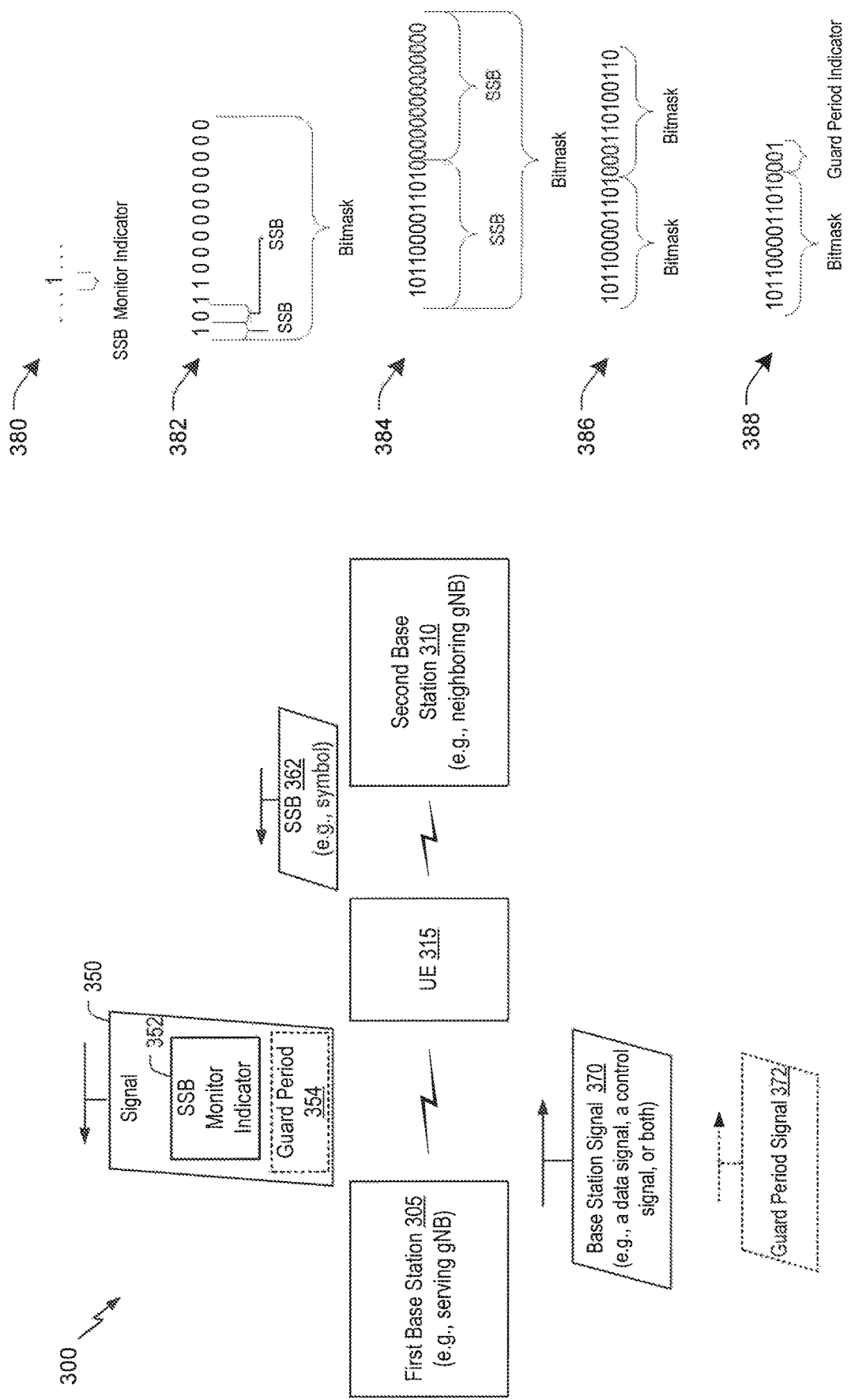
FIG. 3 is a block diagram illustrating aspects of communicating a base station signal (e.g., a data signal, a control signal, or both) from a base station to a UE during a measurement window.

Referring to FIG. 3, a block diagram illustrating a wireless network 300 is shown in which overhead incurred due to UE measurements that use beamforming is reduced. Wireless network includes a first base station 305, a second base station 310, and a UE 315. First base station 305 may be a serving gNB with respect to UE 315 and second base station 310 may be a neighboring gNB with respect to UE 315. First base station 305 and second base station 310 may include or correspond to one of the gNBs 105 of FIGS. 1-2. Accordingly, each of first base station 305 and second base station 310 may include one or more processors, a receiver, a transmitter, etc., as described with reference to gNBs 105 of FIGS. 1-2. UE 315 may include or correspond to one of the UEs 115 of FIGS. 1-2. Accordingly, UE 315 may include one or more processors, a receiver, a transmitter, etc., as described with reference to UEs 115 of FIGS. 1-2.

In the wireless system 300, base stations 305, 310 and UE 315 can use beamforming for wireless communication. For example, each of the base stations 305, 310 can transmit a synchronization signal (SS) using beamforming, such as analog beamforming (e.g., TX beams). To illustrate, base stations 305, 310 may send SS in FR1 (sub-6) and/or in FR2 (mmWave). The SS may include one or more SS blocks (SSBs), which may be grouped into a SSB set (SSBS). For example, a particular base station may transmit a SS that includes an SSB for each beam transmitted by the base station and the particular base station can indicate to the UE 315 which SSBs are included in a particular cell (supported by the particular base station). Accordingly, UE 315 is able to determine use the SS for cell detection, such as to identify where signals are coming from for the particular base station and to then listen for those signals. Additionally, or alternatively, the SS may also be used by UE 315 for other purposes. For example, in 5GNR networks, the SS may also be used for other measurements, such as measurements related to link monitoring, signal quality determinations, and beam management.

UE 315 may use a relatively narrow beam when communicating with a serving base station, such as first base station 305. As compared to when UE 315 is communicating with first base station 305, UE 315 may use a relatively wide beam (e.g., pseudo omni-PO) when scanning for SSs from other base stations, such as neighboring base stations (e.g., second base station 310). Additionally, or alternatively, the beam used for scanning for SSs from neighboring base stations can have a lower gain than a beam used for communicating with a serving base station. To scan for SSs, UE 315 may sweep an RX beam in different directions. For example, over three different time instances (e.g., three measurement windows), the UE 315 may direct the RX beam in three different directions to search for SSs from neighboring base stations.

While UE 315 is scanning for SSs (e.g., SSBs) in the different directions, the RX beam of the UE 315 is not directed at the serving base station and is unable to receive data/control information from the serving base station, such as the first base station 305. Additionally, to listen (e.g., monitor) for SSs from a neighboring base station during a measurement window, UE 315 has to account for timing issues (e.g., non-synchronization) and/or propagation delays with the neighboring base station. For example, if UE 315 is 200 meters from first base station 305 and is 1 km from second base station 310, UE 315 has to account for time to change direction of RX beam and a propagation delay of signals from second base station 310. Accordingly, UE 315 provides a margin, also referred to a guard period, so that UE 315 does not miss SSs from neighboring base stations that come earlier or later than symbols would come from the serving base station.

In some situations, after UE 315 has identified one or more neighboring base stations, UE 315 knows what SSs (e.g., SSBs) are provided by the one or more neighboring base stations. Accordingly, to update measurements associated a particular neighboring base stations, UE 315 knows what SSBs to receive from the particular neighboring base station and when the SSBs occur with a measurement window. In some implementations, to update a particular measurement, UE 315 needs to receive one or more symbols of a SSB (e.g., less than all of the symbols of the SSB). Thus, UE 315 only needs to direct its RX beam in a direction of the particular neighboring base station during a portion of a measurement window.

UE 315 is configured to determine whether UE 315 is to process (e.g., monitor for, receive, and process) at least a portion of a SSB. UE 315 may provide signaling, such as a signal 350, to first base station 305 that indicates what SSBs are to be processed and/or not processed during a measurement window. In some implementations, first base station 305 may assume that UE 315 is unavailable to receive a base station signal (e.g., a data signal, a control signal, or both) from first base station 305 during the measurement window unless first base station 305 receives signal 350. Alternatively, first base station 305 may assume that UE 315 is available to receive a base station signal (e.g., a data signal, a control signal, or both) from first base station 305 during the measurement window unless first base station 305 receives signal 350.

To indicate whether UE 315 is available, signal 350 may include or represent one or more bits (e.g., one or more bit values). For example, UE 315 may send signal 350 to first base station 305 as part of a control signal. The one or more bits may be referred to herein as SSB monitor indicator 352. A value of the one or more bits may indicate whether or not UE 315 is to process one or more symbols of a SSB, process an entire SSB, or process multiple SSBs of a measurement window. In some implementations, each SSB may include 14 symbols, as an illustrative, non-limiting example. A bit value of logical one may correspond to an indication that UE 315 is to process a particular SSB. Alternatively, a bit value of logical zero may correspond to an indication that UE 315 is to process a particular SSB.

In some implementations, SSB monitor indicator 352 may include a single bit that indicates to first base station 305 whether UE 315 is available during an entirety of a measurement window. In other implementations, SSB monitor indicator 352 may include a bit map, where each bit of the bit map corresponds to a different SSB. In yet another implementation, SSB monitor indicator 352 may include a bit map, where each bit of the bit map corresponds to a different symbol. SSB monitor indicator 352 may be associated with a single measurement window or with multiple measurement windows. Additionally, in some implementations, signal 350 may include an indication of a guard period 354. In a particular implementation, the guard period 354 could be indicated by a flag that is included prior to or after SSB monitor indicator 352. The flag may correspond to a single bit or multiple bits.

During operation, UE 315 may determine whether to monitor (and/or process) a portion of a synchronization signal block (SSB) during a measurement window. For example, one or more symbols of the SSB may be transmitted by the second base station 310 during the measurement window. Based on a determination of whether to monitor (and/or process) the portion of the SSB, UE 315 may generate and transmit signal 350. For example, UE 315 may transmit signal 350 to first base station 305 prior to the measurement window. In some implementations, signal 550 may include SSB monitor indicator 352 that indicates a determination of UE 315.

Examples 380-388 of signal 350 (e.g., SSB monitor indicator 352) are depicted to the right of the illustration of wireless network 300 in FIG. 3. As described herein with reference to the examples 380-380, a value of 0 indicates that UE 315 is available to receive data from first base station 305 during a measurement window. However, it is to be understood that this is not intended to be limiting and, in other implementations, a value of 0 may indicate that UE 315 is unavailable to receive data from first base station during a measurement window.

In first example 380 of signal 350, SSB monitor indicator 352 includes a single bit. As shown in first example 380, signal 350 indicates that UE 315 will not monitor an entirety of an SSB set during the measurement window. Alternatively, if the value of the SSB monitor indicator were 0, signal 350 would indicate that UE 315 will monitor during an entirety of and SSB set of the measurement window.

In a second example 382 of signal 350, signal 350 (e.g., SSB monitor indicator 352) includes a bitmask where each bit corresponds to a different SSB during a measurement window. As shown, the signal 350 (e.g., the left most bit position) indicates that UE 315 will not monitor an entirety of a corresponding SSB during the measurement window. Additionally, the signal 350 (e.g., the second left most bit position) indicates that UE 315 will monitor during an entirety of a corresponding SSB of the measurement window. Thus, signal 350 indicates that UE 315 will monitor an entirety of a first SSB and will not monitor an entirety of second SSB during the measurement window.

In a third example 384 of signal 350, signal 350 (e.g., SSB monitor indicator 352) includes a bitmask that represents two SSBs. As shown in third example 384, each bit corresponds to a different symbol of a SSB. Referring to the bits of the left most SSB, signal 350 indicates that UE 315 will monitor a first portion (e.g., a first set of symbols) of the SSB during the measurement window and will not monitor a second portion (e.g., a second set of symbols) of the SSB during the measurement window. Additionally it is noted that the bits of the left most SSB indicate that UE 315 will monitor four different portions (of one or more consecutive symbols) of the corresponding SSB. Referring to the bits of the right most SSB, signal 350 indicates that UE 315 will not monitor an entirety of a corresponding SSB during the measurement window.

In a fourth example 386 of signal 350, signal 350 includes a first bitmask corresponding to a first measurement window and a second bitmask corresponding to a second measurement window. As shown, each bitmask corresponds to the bitmask of second example 382. Alternatively, in other implementations, each bitmask may correspond to the bitmask of third example 384. In a fifth example 388 of signal 350, signal 350 includes a bitmask corresponding to SSB monitor indicator 352 (e.g., availability indicator) and a guard period indicator (corresponding to guard period 354). As shown, the bitmask corresponds to the bitmask of second example 382. Alternatively, in other implementations, the bitmask may correspond to the bitmask of third example 384. The value of the guard period indicator may identify a duration of guard period 354 determined by UE 315. It is noted that a guar period indicator may be included before or after any of the examples 380-388.

After transmission of signal 350 and based on the determination of whether to monitor (and/or process) the portion of the SSB, UE 315 configures a receiver for beamforming and directs the beamformed receiver towards the second base station 310 during a first time period of the measurement window. During the first time period, second base station 310 transmits SSB 362 including one or more symbols and UE 315 receives SSB 362. UE 315 may process SSB 362 to determine signal/channel quality measurements, link monitoring, beam management, etc., as illustrative, non-limiting examples.

After transmission of signal 350 and based on the determination of whether to monitor (and/or process) the portion of the SSB, UE 315 configures the receiver to receive base station signal 370 from first base station 305 during a second time period of the measurement window. For example, base station signal 370 may include a data signal, a control signal, or both. During the second time period, UE 315 receives base station signal 370 from first base station 305 and processes the data or control signal to identify data and/or control information.

In some implementations, UE 315 may determine guard period 354 (e.g., a guard period value/duration) associated with the measurement window. To illustrate, UE 315 may determine guard period 354 based on a propagation delay identified by the UE, a beam switching delay associated with the UE, or both. In a particular implementations, UE determines guard period based on a maximum time difference between received SSBs of different cells. UE 315 may transmit an indication of guard period 354 to the first base station 305. For example, UE 315 may optionally include, as indicated by the dashed box, the indication of guard period 354 in signal 350.

In some implementations, first base station 305 may determine a guard period associated with the measurement window. To illustrate, first base station 305 may determine the guard period based on a distance between base stations and their level of synchronization. First base station 305 may generate a guard period signal 372 that indicates a maximum allowed guard period associated with the measurement window. First base station 305 may send guard period signal 372 to UE 315. In some implementations, UE 315 may provide the indication of guard period 354 to first base station 305 and first base station 305 may provide guard period signal 372 to UE 315. In such implementations, UE 315 may use guard period 354. For example, UE 315 may use guard period 354 based on a determination that guard period 354 is less than or equal to the maximum allowed guard period indicated by the guard period signal 372. Alternatively, UE 315 may use a guard period indicated by the guard period signal 372. For example, UE 315 may use the maximum allowed guard period as the guard period.

In a particular implementation, UE 315 includes one or more processors configured to determine whether to monitor, at UE 315, at least a portion of a synchronization signal block (SSB) during a measurement window. UE 315 further includes a transmitter coupled to the one or more processors, the transmitter configured to transmit, prior to the measurement window, a signal that indicates whether UE 315 will monitor the at least the portion of the SSB during the measurement window. In some implementations of UE 315, UE 315 may further include a receiver coupled to the one or more processors and configured to receive wireless signals, and the one or more processors are further configured to selectively configure the receiver for beamforming. The receiver may include or be coupled to one or more antennas. Additionally, or alternatively, UE 315 may include a memory (e.g., a computer-readable storage medium) coupled to the one or more processors and storing one or more instructions that are executable by the one or more processors.

In a particular implementation, first base station 305 includes a receiver configured to receive, by first base station 305 from UE 315, a signal that indicates whether UE 315 will monitor at least a portion of a synchronization signal block (SSB) during a measurement window. First base station 305 further includes one or more processors coupled to the receiver, the one or more processors configured to initiate transmission, from first base station 305 to UE 315 based on the signal, of a data or control signal during the measurement window.

In another particular implementation, UE 315 includes one or more processors configured to determine a guard period associated with monitoring at least a portion of a synchronization signal block (SSB) during a measurement window. UE 315 further includes a transmitter coupled to the one or more processors, the transmitter configured to transmit, prior to the measurement window, a signal that indicates that indicates the guard period.

In another particular implementation, first base station 305 includes a receiver configured to receive, by first base station 305 from UE 315, a signal that indicates a guard period associated with UE 315 monitoring at least a portion of a synchronization signal block (SSB) during a measurement window. First base station 305 further includes one or more processors coupled to the receiver, the one or more processors configured to initiate transmission, from first base station 305 to UE 315 based on the guard period, of a data or control signal during the measurement window.

In another particular implementation, first base station 305 includes one or more processors configured to determining, by first base station 305, a guard period associated with UE 315 monitoring at least a portion of a synchronization signal block (SSB) during a measurement window. First base station 305 further includes a transmitter coupled to the one or more processors, the transmitter configured to transmit, from first base station 305 to UE 315 prior to the measurement window, a guard period signal that indicates the guard period.

In another particular implementation, UE 315 includes a receiver configured to receive, by UE 315 from first base station 305, a guard period signal that indicates a guard period associated with UE 315 monitoring at least a portion of a synchronization signal block (SSB) during a measurement window. UE 315 further includes one or more processors coupled to the receiver and configured to determine, by UE 315 based on the guard period, a time period during the measurement window when UE 315 is available to receive a data or control signal from first base station 305.

In some implementations of wireless network 300, a SMTC window (e.g., a measurement time configuration window) is not overlapped with measurement gap in non-CA case. In such implementations, in FR2 intra-frequency SS-RSRP/SINR measurement, UE (e.g., 315) is not expected to transmit PUCCH/PUSCH or receive PDCCH/PDSCH on SSB symbols to be measured, X symbol(s) before each consecutive SSB symbols and X symbol(s) after each consecutive SSB symbols within SMTC window duration (assuming that useServingCellTimingForSync is always enabled for FR2), where X is zero or a positive value (e.g., a positive integer). To illustrate, in FR2 intra-frequency SS-RSRP/SINR measurement, UE (e.g., 315) is not expected to transmit PUCCH/PUSCH or receive PDCCH/PDSCH on SSB symbols to be measured, X symbol(s) before each consecutive SSB symbols and X symbol(s) after each consecutive SSB symbols within SMTC window duration assuming that useServingCellTimingForSync is enabled or always enabled for FR2, as an illustrative, non-limiting example. It is noted that in some implementations, a time period corresponding to X may be referred to as a guard period.

In some implementations, X may be equal to 1. In other implementations, X may not be greater than 1. In other implementations, X may be greater than 1. To illustrate, X may be greater than or equal to 4. In some implementations where X may be a relatively large value, e.g., greater than 4, symbols (e.g., all symbols) within SMTC window may not be available for data transmission/reception. In other implementations where X may be a relatively large value, e.g., greater than 4, symbols (e.g. all symbols) within slot(s) containing SSB may not be available for data transmission/reception. With respect to FR2, the guard period may be selected such that the UE (e.g., 315) is able to select an appropriate RX beam to perform either SSB measurements or data/control processing, which may be different. In some implementations, when the current cell synchronization requirement time period, as well as the shortest symbol duration for data/control in FR2, are considered, X may be selected or determined such that X is not greater than 1.

In a particular implementation, the value of "X" for UE measurements in FR2 outside gaps is not larger than 1 (e.g., is less than or equal to 1). Wireless network 300 may experience some inefficiencies when X is relatively small and when a large number of symbols are blanked at each SSB occasion, regardless of the real need for the UE (e.g., 315). Illustrative, non-limiting examples of such situations include: (1) all symbols carrying SSBs and possible guard period around them are blank for data/control, thus leaving little opportunities to still convey information during the periodic processing of SSBs (e.g. 5 ms every 20 ms); (2) the blanking affects all component carriers in intra-band CA in mmWave as the same analog beam is used for the entire frequency range—this further reduces opportunities in CA situations; (3) even if the UE does not make use of a measurement window, the gNB is not aware of that and needs to assume that no data can be processed by the UE for the configured patterns; and/or (4) in case the UE processes only few SSBs within the set (for example UE just needs to perform RLM on SSB), the gNB will assume that all SSBs are affected and no data can be processed in those symbols. To address such inefficiencies, an gNB may be informed ahead of time whether and which SSBs are affected/not affected by the UE operations on a next occasion (and/or a subsequent occasion(s)) of the configured SMTC measurements window.

In a particular implementation, signalling from the UE (e.g., 315) to the gNB (e.g., 305) may indicate to the gNB what SSBs are processed/not processed by the UE at a next occasion (and/or one or more subsequent occasions) of the configured SMTC measurements windows. The format of the signalling can be a simple indication whether SSBs are processed in next SMTC or can include additional information (e.g. via bitmap) about the precise SSBs or the precise symbols (including guard periods when defined) where the UE will process SS or data/control.

Thus, wireless system 300 enables UE 315 to signal to first base station 305 its further availability during a measurement window. In some implementations, the signaling may be provided as part of physical layer measurements and/or physical layer procedures associated with wireless system 300. Based on the signaling, first base station 305 may communicate base station signal 370 (data/control information) to UE 315 during at least a first portion of the measurement window. In some implementations, UE 315 may receive the base station signal 370 from first base station 305 during a first portion of the measurement window and may receive SSB 362 from second base station 310 during a second portion of the measurement window. Additionally, or alternatively, wireless system 300 may permit UE 315 and/or first base station 305 to indicate a guard period associated with the measurement window. Accordingly, the signaling described herein with reverence to the devices of wireless system 300 lower the overhead of performing mobility measurements as compared to wireless systems that do not include such signaling. Additionally, as compared to such wireless system that do not include the described signaling, wireless system is more efficient, has higher data rates, increased capacity, higher spectral efficiency, and lower latency.

Figure 4:
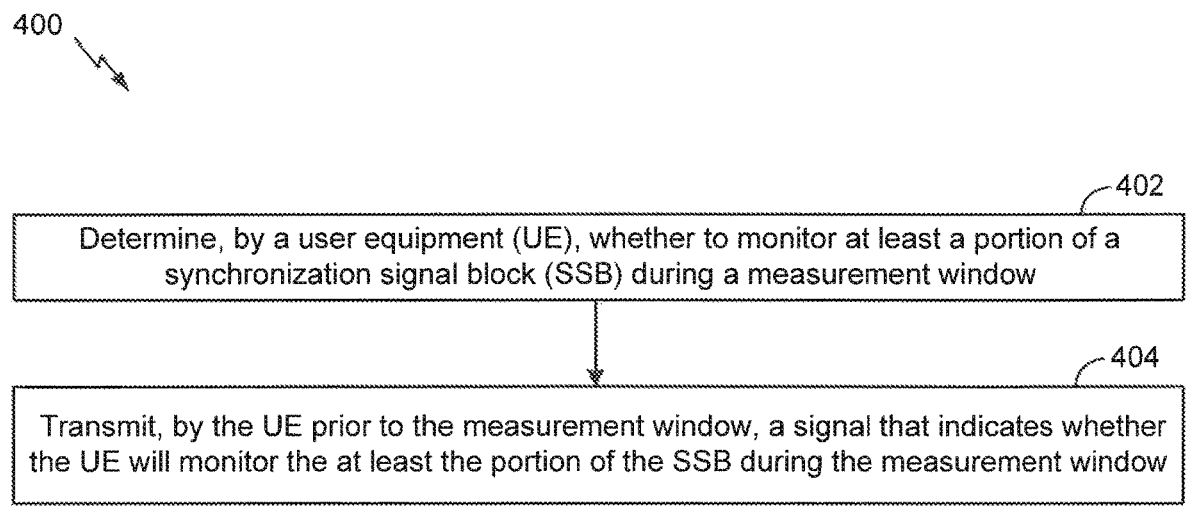
FIG. 4 is a flow diagram illustrating aspects of a method for indicating whether a UE will monitor a portion of a synchronization signal block (SSB) during a measurement window.
Figure 5:
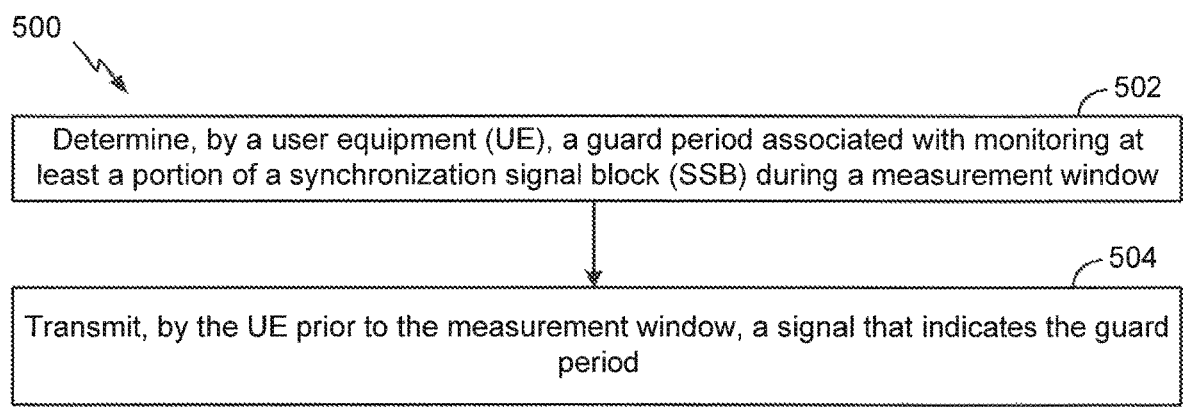
FIG. 5 is a flow diagram illustrating aspects of a method for communicating a guard period.
Figure 6:
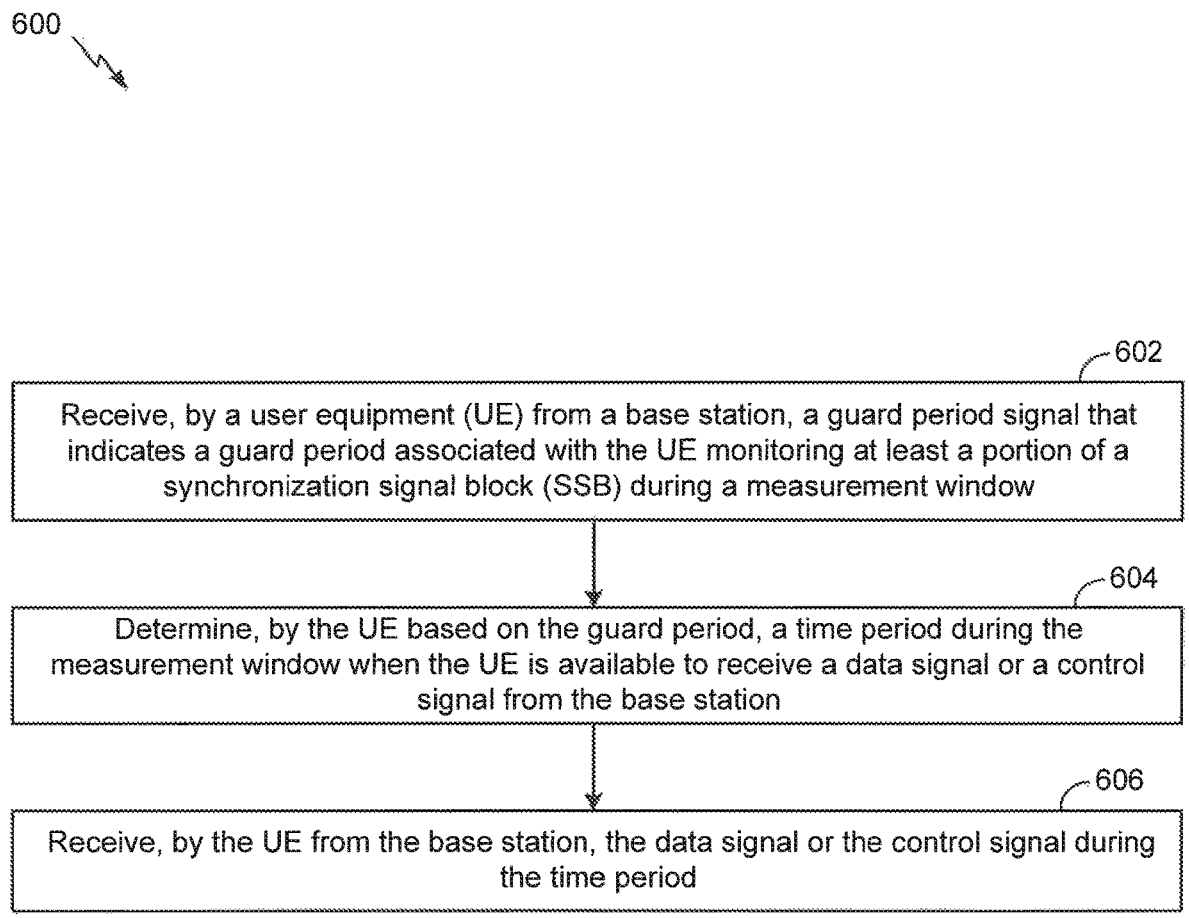
FIG. 6 is a flow diagram of an exemplary method for receiving a base station signal (e.g., a data signal, a control signal, or both) by a UE during a measurement window.

Referring to FIGS. 4-6, flow diagrams illustrating aspects of methods of wireless communication are shown. Each of the methods of FIGS. 4-6 may be performed by a device, such as UE 115 (e.g., processor 280) or UE 315. The device (e.g., UE 115) may be configured to communicate with a first base station (e.g., a serving gNB), such as base station 105, corresponding to a first cell. The device (e.g., UE 115) may further be configured to process one or more SSBs received from a second base station (e.g., a neighbor gNB) corresponding to a second cell. In some implementations, each of the methods of FIGS. 4-6 may be stored as instructions at a computer-readable medium. The instructions, when executed by one or more processors (e.g., one or more of the processors of the UE 115 described and illustrated with respect to FIGS. 1 and 2), may cause the one or more processors to perform operations for wireless communication, as described above with respect to FIG. 3, and as described in more detail below.

Referring to FIG. 4, a flow diagram illustrating aspects of a method for indicating whether a UE will monitor at least a portion of a synchronization signal block (SSB) during a measurement window is shown as a method 400. At 402, the method 400 includes determining, by a user equipment (UE), whether to monitor at least a portion of a synchronization signal block (SSB) during a measurement window. For example, the method 400 may include determining, by the UE, to monitor the at least the portion of the SSB, and generating the signal to indicate the UE will monitor the at least the portion of the SSB during the measurement window. As another example, the method 400 may include determining, by the UE, to not monitor the at least the portion of the SSB, and generating the signal to indicate the UE will not monitor the at least the portion of the SSB during the measurement window.

At 404, the method 400 includes transmitting, by the UE prior to the measurement window, a signal that indicates whether the UE will monitor the at least the portion of the SSB during the measurement window. For example, the signal may include or correspond to signal 350. The signal may be transmitted from the UE to a base station, the signal may be associated with uplink control information and included in an uplink control signal, or both. In some implementations, where the signal represents a single bit having a value that indicates whether the UE will monitor the at least the portion of the SSB during the measurement window. To illustrate, the value of the single bit indicates whether the UE will monitor for SSBs during an entirety of the measurement window. In other implementations, the signal represents a bitmap. In some such implementations, each bit of the bitmap corresponds to a different SSB during the measurement window, and where a value of each bit of the bitmap indicates whether the UE will monitor the corresponding SSB during the measurement window. In other such implementations, the bitmap includes multiple groups of bits, each group of bits corresponds to a different SSB during the measurement window, and each bit of a group of bits of the multiple group of bits corresponds to a different symbol included in the corresponding SSB. For example, a value of each bit indicates whether the UE will monitor the corresponding symbol during the measurement window.

In some implementations, the signal indicates that the UE will monitor the portion of the SSB and will not monitor another portion of another SSB during the measurement window. In other implementations, the signal indicates that the UE will an entirety of the SSB and will monitor an entirety of another SSB during the measurement window. In yet another implementation, the signal may indicate that the UE will an entirety of the SSB and will not monitor an entirety of another SSB during the measurement window. Alternatively, the signal may indicate that the UE will monitor an entirety of the SSB and will not monitor an entirety of another SSB during the measurement window.

In some implementations, the method 400 may also include receiving, at the UE, a guard period signal from a base station, the guard period signal indicating a maximum allowed guard period associated with the measurement window. Additionally, or alternatively, the method 400 may include determining, at the UE a guard period associated with monitoring the at least the portion of the SSB, where the signal further indicates the guard period. For example, the guard period may be determined based on a propagation delay identified by the UE, a beam switching delay associated with the UE, a maximum allowed guard period indicated by a base station, or a combination thereof. In some such implementations, where the signal may represent one or more bits having a value that indicates the guard period.

In some implementations, the method 400 may further include configuring a receiver of the UE for beamforming and directing the receiver configured for beamforming in a first direction associated with a cell, the first direction associated with the cell different from a second direction associated with the base station. Additionally, or alternatively, the method 400 may also include monitoring, via the beamformed configured receiver, for the at least the portion of the SSB during a first portion of the measurement window, receiving the at least the portion of the SSB, and processing the at least the portion of the SSB.

In some implementations, the method 400 may include configuring the receiver of the UE to receive a data or control signal (e.g., the base station signal) from the base station during a second portion of the measurement window. In some such implementations, the method 400 may also include receiving the data signal or control signal (e.g., the base station signal) from the base station during the second portion of the measurement window, and processing the data signal or control signal (e.g., the base station signal).

Referring to FIG. 5, a flow diagram illustrating aspects of a method communicating a guard period is shown as a method 500. At 502, the method 500 includes determining, by a user equipment (UE), a guard period associated with monitoring at least a portion of a synchronization signal block (SSB) during a measurement window. For example, the guard period may be determined based on a propagation delay identified by the UE, a beam switching delay associated with the UE, or both. In some implementations, the guard period may be determined such that the guard period is less than or equal to a maximum allowed guard period (indicated by a base station) associated with the measurement window. At 504, the method 500 includes transmitting, by the UE prior to the measurement window, a signal that indicates the guard period. For example, the signal may be transmitted from the UE to a base station, the signal may be associated with uplink control information and included in an uplink control signal, or both. The signal may represent one or more bits having a value that indicates the guard period.

Referring to FIG. 6, a flow diagram illustrating aspects of a method for receiving base station signal (e.g., a data signal, a control signal, or both) by a UE during a measurement window is shown as a method 600. The base station signal may include or correspond to the base station signal 370. At 602, the method 600 includes receiving, by a user equipment (UE) from a base station, a guard period signal that indicates a guard period associated with the UE monitoring at least a portion of a synchronization signal block (SSB) during a measurement window. In some implementations, the guard period may include a maximum allowed guard period associated with the UE monitoring the at least the portion of the SSB during the measurement window. At 604, the method 600 includes determining, by the UE based on the guard period, a time period during the measurement window when the UE is available to receive a data signal or a control signal from the base station. At 606, the method 600 includes receiving, by the UE from the base station, the data signal or the control signal during the time period.

In some implementations, the method 600 may further include determining, by the UE based on the guard period, a second time period during measurement window when the UE is available to receive the at least the portion of the SSB during the measurement window. In some such implementations, the method 600 may also include receiving, by the UE from another base station during the second time period, the at least the portion of the SSB during the measurement window.

Figure 7:
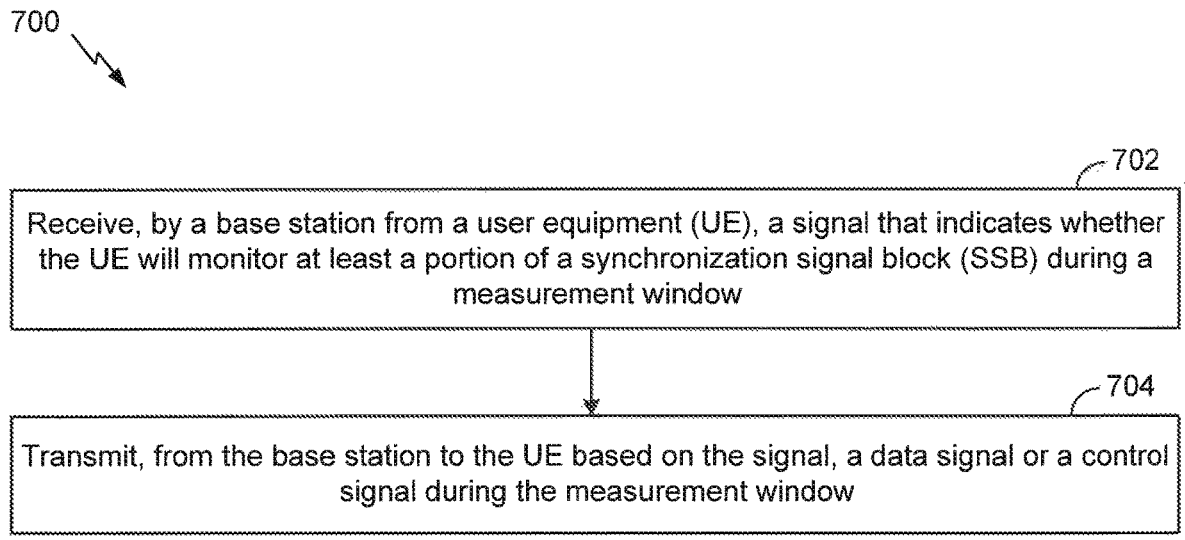
FIG. 7 is a flow diagram illustrating aspects of a method for communicating a base station signal (e.g., a data signal, a control signal, or both) to a UE during a measurement window.
Figure 8:
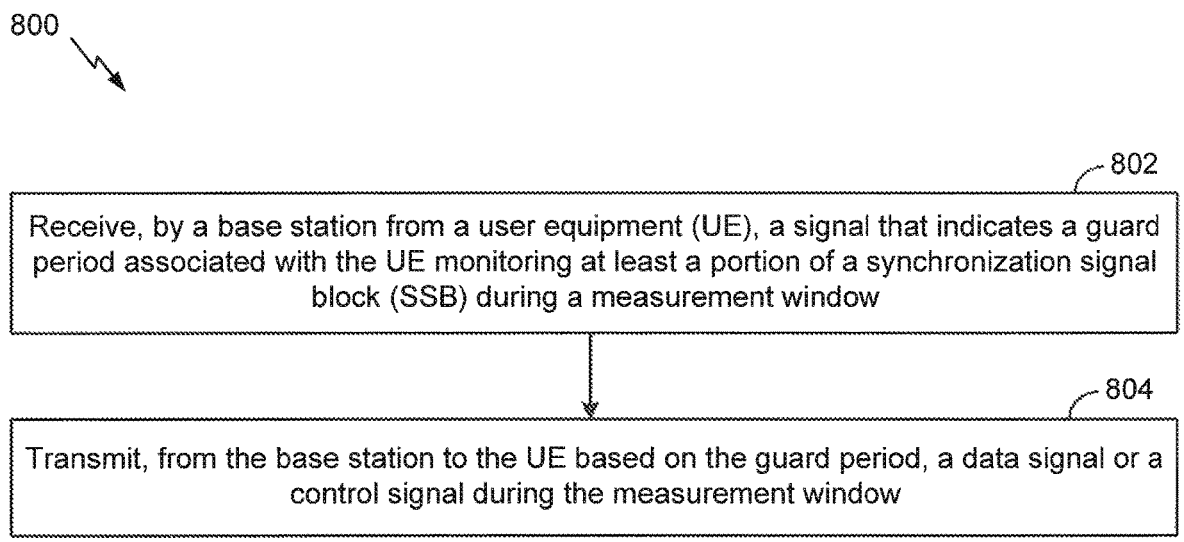
FIG. 8 is a flow diagram illustrating aspects of another method for communicating a base station signal (e.g., a data signal, a control signal, or both) to a UE during a measurement window.
Figure 9:
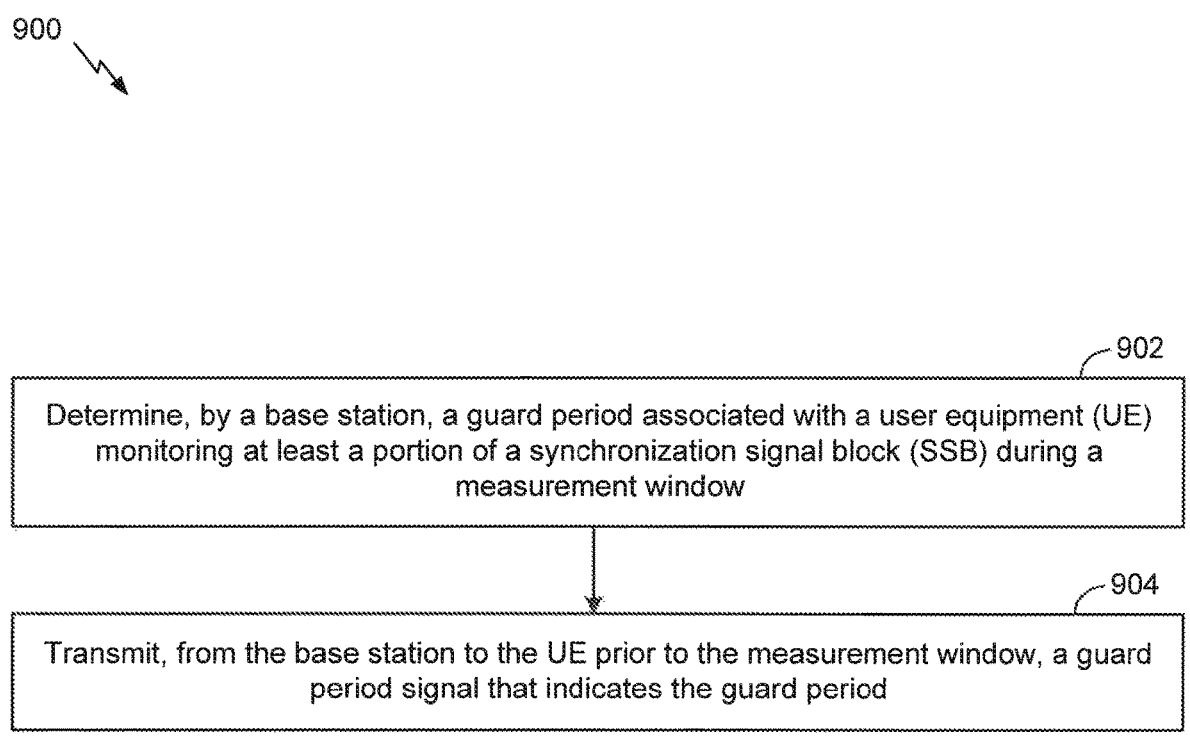
FIG. 9 is a flow diagram illustrating aspects of another method for communicating a guard period.

Referring to FIGS. 7-9, flow diagrams illustrating aspects of a methods wireless communication are shown. Each of the methods of FIGS. 7-9 may be performed by a device, such as base station 105 (e.g., processor 240) or first base station 305. The device (e.g., a serving gNB) may be configured to communicate with another device, such as UE 115 or UE 315. In some implementations, each of the methods of FIGS. 7-9 may be stored as instructions at a computer-readable medium. The instructions, when executed by one or more processors (e.g., one or more of the processors of the base station 105 described and illustrated with respect to FIGS. 1 and 2), may cause the one or more processors to perform operations for wireless communication, as described above with respect to FIG. 3, and as described in more detail below.

Referring to FIG. 7, a flow diagram illustrating aspects of a method for communicating a base station signal (e.g., a data signal, a control signal, or both) to a UE during a measurement window is shown as a method 700. The base station signal may include or correspond to the base station signal 370. At 702, the method 700 includes receiving, by a base station from a user equipment (UE), a signal that indicates whether the UE will monitor at least a portion of a synchronization signal block (SSB) during a measurement window. At 704, the method 700 includes transmitting, from the base station to the UE based on the signal, a data signal or a control signal during the measurement window.

In some implementations, transmitting the data signal or the control signal includes transmitting the data signal or the control signal to the UE during an entirety of the measurement window. In other implementations, the method 700 may include determining, by the base station based on the signal, a first time period of the measurement window when the UE is available to receive the data signal or the control signal. The data signal or the control signal may be transmitted during the first time period. Additionally, the base station signal (e.g., 370) may further indicate a guard period associated with the UE performing a monitoring operation during the measurement window, and the first time period is further determined based on the guard period. For example, the guard period may include or correspond to the guard period signal 372. The method 700 may also include determining, by the base station based on the signal, a second time period of a second measurement window when the UE is available to receive a second data signal or a second control signal, and transmitting, from the base station to the UE, the second data signal or the second control signal during the second time period.

In some implementations, the method 700 further includes receiving, by the base station from the UE, a second signal that indicates whether the UE will monitor a second portion of a second SSB during a second measurement window. For example, the second signal is received subsequent to the measurement window and prior to the second measurement window. In such implementations, the method 700 may also include determining, by the base station based on the second signal, a second time period of the second measurement window when the UE is available to receive a second data signal or a second control signal, and transmitting, from the base station to the UE, the second data signal or the second control signal during the second time period.

Referring to FIG. 8, a flow diagram illustrating aspects of a method for communicating a base station signal (e.g., a data signal, a control signal, or both) to a UE during a measurement window is shown as a method 800. The base station signal may include or correspond to the base station signal 370. At 802, the method 800 includes receiving, by a base station from a user equipment (UE), a signal that indicates a guard period associated with the UE monitoring at least a portion of a synchronization signal block (SSB) during a measurement window. At 804, the method 800 further includes transmitting, from the base station to the UE based on the guard period, a data signal or a control signal during the measurement window. The guard period may include or correspond to the guard period signal 372. In other implementations, the guard period (e.g., 354) may be indicated by the UE. In some implementations, the method 800 may include determining, by the base station based on the guard period, a first time period of the measurement window when the UE is available to receive the data signal or the control signal. The first time period may be distinct from the guard period (e.g., the first time period does not include the guard period such that the data signal or the control signal is scheduled outside of the guard period). In such implementations, the data signal or the control signal may be transmitted during the first time period. Additionally, or alternatively, the method 800 may include scheduling transmission of the data signal or the control signal during the first time period. The first time period may be distinct from the guard period, which may be included in a second time period associated with the measurement window in which the UE is unavailable to receive the data signal, the control signal, or both.

Referring to FIG. 9, a flow diagram illustrating aspects of a method for communicating a guard period is shown as a method 900. At 902, the method 900 includes determining, by a base station, a guard period associated with a user equipment (UE) monitoring at least a portion of a synchronization signal block (SSB) during a measurement window. For example, the guard period may include a maximum allowed guard period associated with the UE monitoring the at least the portion of the SSB during the measurement window. The guard period may be determined based on a distance between the base station and another base station, a level of synchronization between the base station and the other base station, or both. At 904, the method 900 further includes transmitting, from the base station to the UE prior to the measurement window, a guard period signal that indicates the guard period. For example, the guard period signal may be associated with downlink control information and may be included in a downlink control signal. The guard period signal may include or correspond to the guard period signal 372.

Additionally, or alternatively, the method 900 may further include receiving a second guard period (e.g., 354) from the UE. In such implementations, method 900 may include selecting one of the guard period (e.g., 372) or the second guard period (e.g., 354) for use.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. For example, the one or more processors of the UE 115 illustrated in FIGS. 1 and 2 may be utilized to perform the operations described with respect the system 300 of FIG. 3, with respect to the methods of FIGS. 4-6, or both. As another example, one or more of the processors of the gNB 105 illustrated FIG. 2 may be utilized to perform the operations described with respect the system 300 of FIG. 3, with respect to the methods of FIGS. 7-9, or both.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Additionally, a first portion of one of the methods of FIGS. 4-9 may be combined with at least a second portion of another one of the methods of FIGS. 4-9. For example, a first portion of the method 400 of FIG. 4 may be combined with a second portion of the method 600 of FIG. 6. As another example, a first portion of the method 700 of FIG. 7 may be combined with a second portion of the method 900 of FIG. 9. As a further example, a first portion of the method 400 of FIG. 4 may be combined with a second portion of the method 900 of FIG. 9.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   determining, by a user equipment (UE), whether to monitor at least a portion of a synchronization signal block (SSB) during a measurement window, wherein the SSB is received from one or more neighboring base stations; and
   transmitting, by the UE prior to the measurement window to a serving base station that is distinct from the one or more neighboring base stations, a signal that indicates whether the UE will monitor the at least the portion of the SSB during the measurement window.

2. The method of claim 1, further comprising:
   determining, by the UE, to monitor the at least the portion of the SSB; and
   generating the signal to indicate the UE will monitor the at least the portion of the SSB during the measurement window.

3. The method of claim 1, wherein the signal represents a single bit having a value that indicates whether the UE will monitor the at least the portion of the SSB during the measurement window.

4. The method of claim 3, wherein the value of the single bit indicates whether the UE will monitor for SSBs during an entirety of the measurement window.

5. The method of claim 1, wherein:
   the signal represents a bitmap;
   each bit of the bitmap corresponds to a different SSB during the measurement window; and
   a value of each bit of the bitmap indicates whether the UE will monitor the corresponding SSB during the measurement window.

6. The method of claim 1, wherein:
   the signal represents a bitmap;
   the bitmap includes multiple groups of bits, each group of bits corresponds to a different SSB during the measurement window, and each bit of a group of bits of the multiple group of bits corresponds to a different symbol included in the corresponding SSB; and
   a value of each bit indicates whether the UE will monitor the corresponding symbol during the measurement window.

7. The method of claim 1, further comprising:
receiving, at the UE, a guard period signal from the serving base station, the guard period signal indicating a maximum allowed guard period associated with the measurement window.

8. The method of claim 1, wherein the signal is transmitted from the UE to the serving base station, and wherein the signal is associated with uplink control information and included in an uplink control signal, and further comprising receiving, at the UE, a base station signal from the serving base station during an entirety of the measurement window, the base station signal comprising a data signal, a control signal, or both.

9. The method of claim 1, further comprising:
determining, by the UE, to not monitor the at least the portion of the SSB; and
generating the signal to indicate the UE will not monitor the at least the portion of the SSB during the measurement window.

10. The method of claim 1, further comprising:
determining, at the UE a guard period associated with monitoring the at least the portion of the SSB, wherein the signal further indicates the guard period;
wherein the guard period is determined based on a propagation delay identified by the UE, a beam switching delay associated with the UE, or both; and
wherein the signal represents one or more bits having a value that indicates the guard period.

11. The method of claim 1, further comprising:
configuring a receiver of the UE for beamforming;
directing the receiver configured for beamforming in a first direction associated with a cell, the first direction associated with the cell different from a second direction associated with the serving base station;
monitoring, via the beamformed configured receiver, for the at least the portion of the SSB during a first portion of the measurement window;
processing the at least the portion of the SSB received by the UE via the receiver;
configuring the receiver of the UE to receive a base station signal from the serving base station during a second portion of the measurement window, the base station signal comprising a data signal, a control signal, or both; and
processing the base station signal received from the serving base station during the second portion of the measurement window.

12. An apparatus for wireless communication, the apparatus comprising:
one or more processors configured to determine whether to monitor, at a user equipment (UE), at least a portion of a synchronization signal block (SSB) during a measurement window, wherein the SSB is received from one or more neighboring base stations; and
a transmitter coupled to the one or more processors, the transmitter configured to transmit, prior to the measurement window and to a serving base station that is distinct from the one or more neighboring base stations, a signal that indicates whether the UE will monitor the at least the portion of the SSB during the measurement window.

13. The apparatus of claim 12, further comprising:
a receiver coupled to the one or more processors and configured to receive wireless signals, wherein the one or more processors are further configured to selectively configure the receiver for beamforming; and
a memory coupled to the one or more processors and storing one or more instructions that are executable by the one or more processors.

14. The apparatus of claim 12, wherein the signal indicates that the UE will or will not monitor the at least the portion of the SSB during the measurement window.

15. The apparatus of claim 12, wherein the signal indicates that the UE will or will not monitor during an entirety of the SSB of the measurement window.

16. The apparatus of claim 12, wherein the signal indicates that the UE will or will not monitor during an entirety of an SSB set of the measurement window.

17. The apparatus of claim 12, wherein the signal indicates that the UE will monitor the portion of the SSB and will not monitor another portion of the SSB.

18. The apparatus of claim 12, wherein the signal indicates that the UE will monitor the portion of the SSB and will or will not monitor another portion of another SSB during the measurement window.

19. The apparatus of claim 12, wherein the signal indicates that the UE will monitor an entirety of the SSB and will or will not monitor an entirety of another SSB during the measurement window.

20. A method for wireless communication, the method comprising:
receiving, by a serving base station from a user equipment (UE), a signal that indicates whether the UE will monitor at least a portion of a synchronization signal block (SSB) during a measurement window, the SSB corresponding to one or more neighboring base stations of the UE, the one or more neighboring base stations distinct from the serving base station; and
transmitting, from the serving base station to the UE based on the signal, a data signal or a control signal during the measurement window.

21. The method of claim 20, further comprising:
determining, by the serving base station based on the signal, a first time period of the measurement window when the UE is available to receive the data signal or the control signal, wherein the data signal or the control signal is transmitted during the first time period.

22. The method of claim 21, wherein the signal further indicates a guard period associated with the UE performing a monitoring operation during the measurement window, and wherein the first time period is further determined based on the guard period.

23. The method of claim 21, further comprising:
determining, by the serving base station based on the signal, a second time period of a second measurement window when the UE is available to receive a second data signal or a second control signal; and
transmitting, from the serving base station to the UE, the second data signal or the second control signal during the second time period.

24. The method of claim 20, wherein transmitting the data signal or the control signal comprises transmitting the data signal or the control signal to the UE during an entirety of the measurement window.

25. The method of claim 20, further comprising:
receiving, by the serving base station from the UE, a second signal that indicates whether the UE will monitor a second portion of a second SSB during a second measurement window;
determining, by the serving base station based on the second signal, a second time period of the second measurement window when the UE is available to receive a second data signal or a second control signal; and transmitting, from the serving base station to the UE, the second data or the second control signal during the second time period.

26. The method of claim 25, wherein the second signal is received subsequent to the measurement window and prior to the second measurement window.

27. The method of claim 20, further comprising:

receiving, from the UE, an indication of a guard period associated with the UE monitoring at least the portion of the SSB during the measurement window;

determining, by the serving base station based on the guard period, a first time period of the measurement window when the UE is available to receive the data signal or the control signal, wherein the data signal or the control signal is transmitted during the first time period; and scheduling transmission of the data signal or the control signal during the first time period, the first time period distinct from the guard period.

28. An apparatus for wireless communication, the apparatus comprising:

a receiver configured to receive, by a serving base station from a user equipment (UE), a signal that indicates whether the UE will monitor at least a portion of a synchronization signal block (SSB) during a measurement window, the SSB corresponding to one or more neighboring base stations of the UE, the one or more neighboring base stations distinct from the serving base station; and one or more processors coupled to the receiver, the one or more processors configured to initiate transmission, from the serving base station to the UE based on the signal, of a data signal or a control signal during the measurement window.

29. The apparatus of claim 28, further comprising:

a transmitter coupled to the one or more processors, the transmitter configured to transmit the data signal or the control signal; and a memory coupled to the one or more processors and storing one or more instructions that are executable by the one or more processors.

30. The apparatus of claim 28, wherein:

the receiver is further configured to receive, from the UE, an indication of a guard period associated with the UE monitoring at least the portion of the SSB during the measurement window; and the one or more processors is further configured to initiate the transmission based on the guard period.

* * * * *